United States Patent [19]

Menge

[11] Patent Number: 4,541,521
[45] Date of Patent: Sep. 17, 1985

[54] APPARATUS FOR SINGULARIZING TRAYS FOR CIGARETTES OR THE LIKE

[75] Inventor: Günter Menge, Hamburg, Fed. Rep. of Germany

[73] Assignee: Hauni-Werke Körber & Co. K.G., Hamburg, Fed. Rep. of Germany

[21] Appl. No.: 678,370

[22] Filed: Dec. 5, 1984

Related U.S. Application Data

[63] Continuation of Ser. No. 425,461, Sep. 28, 1982, abandoned.

[30] Foreign Application Priority Data

Dec. 17, 1981 [DE] Fed. Rep. of Germany ....... 3149985

[51] Int. Cl.$^4$ .......................... A24C 5/35; A24C 5/352
[52] U.S. Cl. ............................... 198/463.5; 198/464.2
[58] Field of Search ............... 198/345, 460, 466, 472, 198/491, 492, 634

[56] References Cited

U.S. PATENT DOCUMENTS

| | | | |
|---|---|---|---|
| 1,367,081 | 2/1921 | Olson | 198/492 |
| 1,556,438 | 10/1925 | Hanson et al. | 198/492 X |
| 2,835,372 | 5/1958 | Biddison | 198/492 X |
| 3,217,859 | 11/1965 | Bartlo et al. | 198/492 X |
| 3,251,452 | 5/1966 | Conway et al. | 198/460 |
| 3,545,588 | 12/1970 | Corley | 198/345 |
| 3,584,720 | 6/1971 | Hartzell | 198/492 |
| 3,752,295 | 8/1973 | Hubbell et al. | 198/491 X |
| 4,008,796 | 2/1977 | Aylon | 198/492 X |
| 4,240,540 | 12/1980 | Hobbs et al. | 198/492 |
| 4,394,897 | 7/1983 | Brems | 198/345 |

Primary Examiner—Joseph E. Valenza
Assistant Examiner—David A. Bucci
Attorney, Agent, or Firm—Peter K. Kontler

[57] ABSTRACT

Successive foremost trays of a row of trays on the upper reaches of several endless belt conveyors are advanced away from the remainder of the row toward a lifting device by setting the conveyors in motion while a blocking device engages the remaining trays and holds them against movement with the conveyors. The blocking device can lift the remaining trays above the conveyors, or is provided with a profile which engages complementary profiles at the undersides of the remaining trays. A pawl holds the foremost tray against movement with the conveyors while the blocking device is disengaged from the trays behind the foremost tray.

16 Claims, 5 Drawing Figures

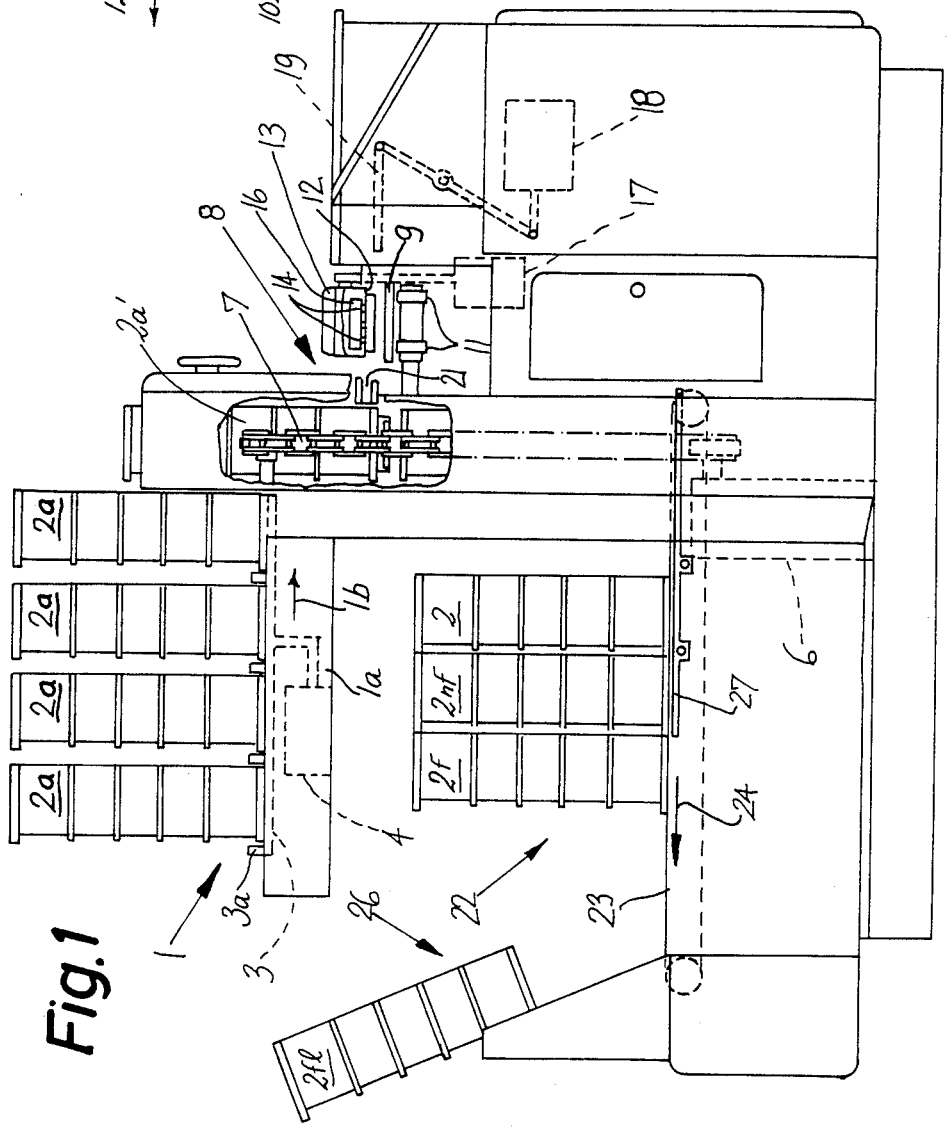
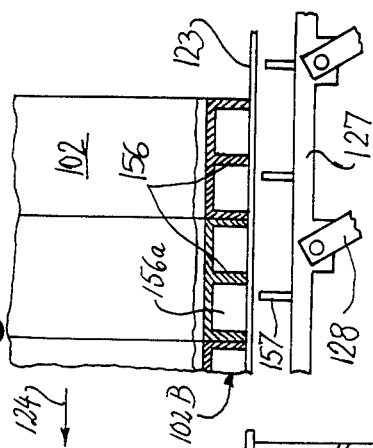
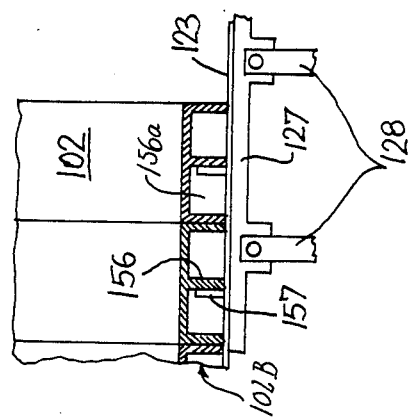

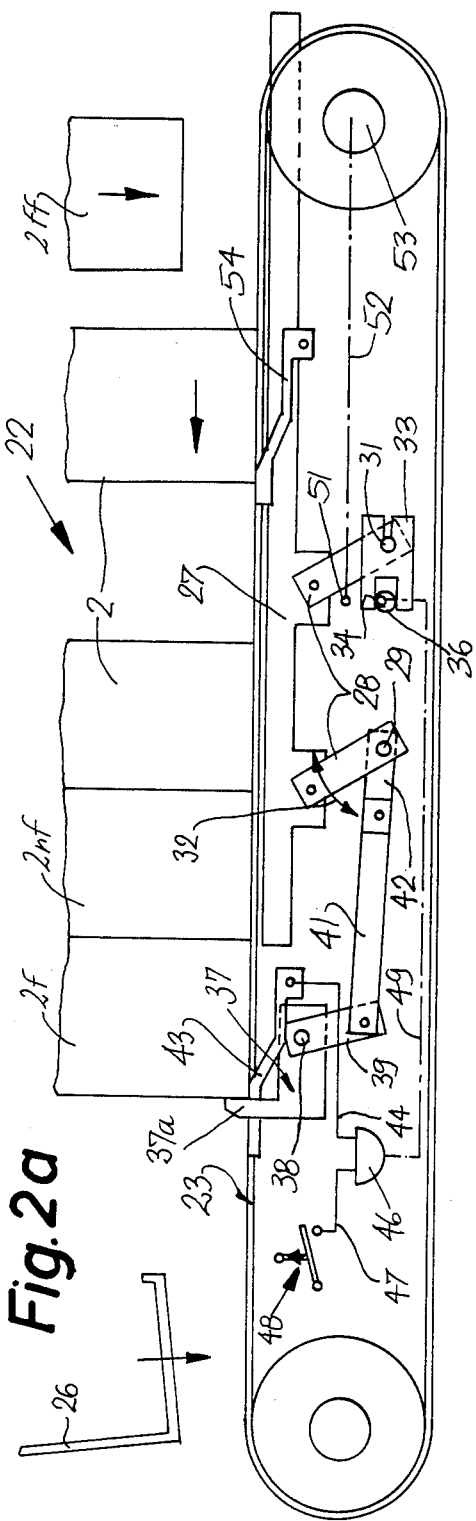
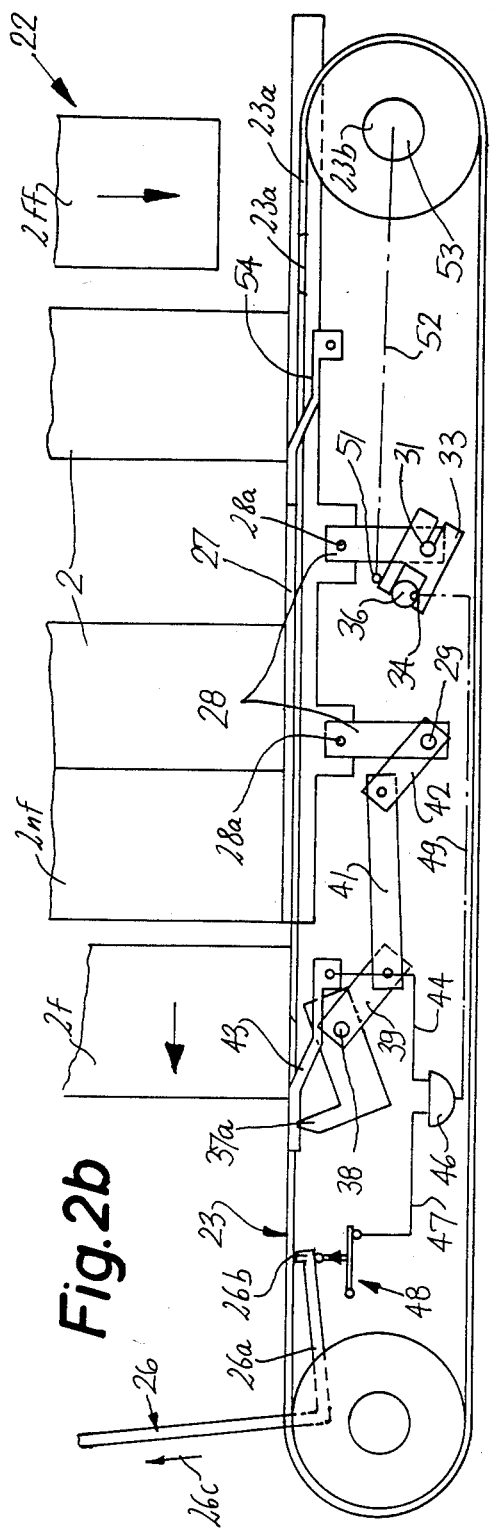

APPARATUS FOR SINGULARIZING TRAYS FOR CIGARETTES OR THE LIKE

This application is a continuation of application Ser. No. 425,461, filed Sept. 28, 1982 now abandoned.

BACKGROUND OF THE INVENTION

The present invention relates to apparatus for manipulating discrete commodities which form rows of successive and preferably identically oriented commodities. More particularly, the invention relates to improvements in apparatus for singularizing discrete commodities which form a row and wherein the singularizing operation involves moving successive foremost commodities of the row away from the remaining commodity or commodities. Examples of such commodities are so-called chargers or trays which are used for temporary storage of stacked plain or filter cigarettes, filter rod sections and/or other rod-shaped articles which constitute or form part of smokers' products.

It is well known to introduce rod-shaped articles of the tobacco processing industry into chargers or trays (hereinafter called trays) which are used for temporary storage of confined articles as well as for transport of the articles to a processing station. For example, if the stored articles are plain or filter cigarettes, they can be transported to and discharged into the magazine of a packing machine.

Machines which introduce rod-shaped articles (hereinafter referred to as cigarettes with the understanding, however, that the apparatus of the present invention can be used with equal advantage for the manipulation of trays which contain rod-shaped articles of many other kinds, especially plain or filter cigarillos, cigars or cheroots as well as filter rod sections of unit length or multiple unit length) into trays normally gather filled trays into rows and cooperate with a device, (normally a lifting device) which receives successive filled trays of the row and transports them to a processing station, such as the aforementioned magazine of a packing machine. Analogously, empty trays are or can be delivered to or stored in the form of rows at a tray filling station, and the foremost empty tray must be delivered to the filling station whenever the filling of the preceding tray is completed. Separation of successive foremost empty or filled trays from the remainder of a row of neighboring empty or filled trays must be effected with a high degree of reliability and accuracy in order to ensure that the next following station will receive empty or filled trays without any delay, i.e., that the output of the tray filling or tray evacuating machine will not suffer as a result of a delay or inaccurate delivery of successive filled or empty trays.

OBJECTS AND SUMMARY OF THE INVENTION

An object of the invention is to provide a novel and improved apparatus for singularizing trays for cigarettes or the like in a novel and improved way so as to ensure reliable advancement of successive foremost trays to the next processing station, such as a station where the trays are filled with cigarettes or the like or a station where the trays are relieved of their contents.

Another object of the invention is to provide a singularizing apparatus which is just as compact as heretofore known apparatus but is more reliable and more accurate as concerns the timing and extent of advancement of successive foremost commodities which can form a relatively short or a relatively long row of neighboring commodities.

A further object of the invention is to provide an apparatus which can singularize successive foremost commodities of a short or long row of neighboring commodities without the danger of changing the orientation of the commodities preparatory to, during and/or after segregation of successive foremost commodities.

An additional object of the invention is to provide a tray singularizing apparatus which prevents any interlinking of neighboring trays preparatory, during or subsequent to advancement of successive foremost trays away from the next-following trays of the row, and which can move each of a long series of successive trays to an accurately determined position for reception by instrumentalities serving to deliver such trays to the next processing station or to treat the trays at the next processing station.

Still another object of the invention is to provide a novel and improved method of manipulating successive foremost cigarette trays or analogous relatively bulky commodities in a small area, with little loss in time, and with a heretofore unmatched degree of accuracy and reproducibility.

A further object of the invention is to provide the apparatus with novel and improved means for preventing the foremost trays from entraining or changing the orientation of the next-following trays and/or vice versa.

Another object of the invention is to provide the apparatus with novel and improved means for ensuring that the sequence of various steps is maintained and repeated with a high degree of accuracy.

An additional object of the invention is to provide an apparatus which can singularize trays of a wide variety of sizes and shapes and which can be readily installed in existing tray filling or evacuating machines.

Another object of the invention is to provide the apparatus with novel and improved means for ensuring that the singularizing operation invariably begins while the foremost tray of a short or long series of neighboring trays is maintained in a predetermined position with reference to the device which is to receive such foremost tray from the apparatus.

A further object of the invention is to provide an apparatus which can singularize all or practically all existing types of trays for cigarettes, filter rod sections or the like.

An additional object of the invention is to provide an apparatus which can cooperate with existing tray filling devices as well as with existing tray accepting and transporting devices in cigarette making or similar plants.

The invention is embodied in an apparatus for singularizing the commodities which form a row of successive commodities, particularly for singularizing trays which can store stacks of cigarettes or the like. The apparatus comprises conveyor means which is arranged to support the row of commodities and to advance successive foremost commodities of the row in a predetermined direction and along a predetermined path away from the remaining commodities of the row, and means for blocking the movement of the next-to-the-foremost commodity of the row in the path with the foremost commodity. The apparatus preferably further comprises means for moving the blocking means substantially transversely of the path between an operative position in which the blocking means prevents advancement of the next-to-the-foremost commodity in the aforementioned direction (i.e., in which the blocking means prevents all commodities forming the remainder of the row from advancing in the predetermined direction) and an inoperative position in which the blocking means is out of engagement with the commodities in the path so that the conveyor means can advance the commodities of the entire row in the aforementioned direction.

The apparatus further comprises means for supplying fresh commodities to the tail end of the row in the path and means for receiving successive foremost commodities from the conveyor means. The receiving means can comprise a device which lifts successive foremost commodities to a level above the path.

The conveyor means can comprise several discrete endless chain or belt conveyors having spaced parallel reaches defining the aforementioned path for the row of commodities and for advancement of successive foremost commodities toward the receiving means.

The moving means can be constructed, assembled and operated in such a way that the blocking means is disposed at a level above the path when it assumes the operative position and at a level below the path when it is moved to the inoperative position. The path is preferably horizontal or nearly horizontal. For example, the moving means can comprise links which are pivotable about substantially horizontal axes to move the blocking means substantially counter to the aforementioned direction during movement of the blocking means from the inoperative to the operative position. Such links can raise the blocking means into engagement with commodities in the path, at least during the last stage of movement of the blocking means to its operative position. The links are preferably parallel to each other and, together with the blocking means, can constutute a parallel motion mechanism which raises or lowers the blocking means, depending upon the direction of pivotal movement of the links about their respective axes. Such links are articulately connected with the blocking means which latter can comprise one or more platforms movable above and below the path by moving between and/or outside of the upper reaches of the endless conveyors which constitute or form part of the conveyor means.

The aforementioned receiving means is movable to and from a commodity-accepting position, and the apparatus can further comprise means for monitoring the receiving means and for generating a signal when the receiving means assumes such accepting position, and means for activating the moving means so as to move the blocking means to the operative position in the accepting position of the receiving means. As stated above, the receiving means can comprise a device for lifting or shifting successive foremost commodities from the level of the path to a different level (preferably to a level above the path), and the shifting device assumes the aforementioned accepting position when it is ready to receive the foremost commodity from the conveyor means while such commodity advances along the path.

The apparatus can further comprise detector means which is adjacent to the path and is arranged to generate signals in response to detection of advancement of the foremost commodity away from the remainder of the row in the path, and means for activating the moving means in response to such signals so as to move the blocking means from the operative to the inoperative position, i.e., to enable the conveyor means to advance all of the commodities in the path. Such detector means can comprise at least one mechanical sensor.

The apparatus further comprises drive means which is activatable to set the conveyor means in motion, and the apparatus preferably also comprises second detector means for monitoring the position of the blocking means and for generating signals when the blocking means assumes its operative position, as well as means for activating the drive means in response to signals from the second detector means so that the drive means sets the conveyor means in motion while the blocking means allows only the foremost commodity of the row to advance toward the receiving means. The second detector means can also comprise one or more mechanical sensors.

The apparatus can further comprise an arresting device which is movable between a first position wherein the arresting device extends into the path in front of the foremost commodity of the row and a second position in which the arresting device is outside such path and permits the foremost commodity to advance along the path toward the receiving means under the action of the conveyor means. The arresting device is located downstream of the blocking means, as considered in the aforementioned direction, and is preferably spaced apart from the blocking means by a distance which at least equals the width of a commodity in the path (as considered in the aforementioned direction). The arresting device can comprise a pawl which is pivotable to and from its first position and includes a pallet extending into the path in front of the foremost commodity in the first position of the pawl. The arrangement is preferably such that the pawl is pivoted by the means for moving the blocking means, namely, the pawl is pivoted to first position while the blocking means is being moved to its inoperative position and vice versa.

The apparatus can be used for singularizing commodities (e.g., upright trays) which have flat bottoms and are simply lifted by the blocking means while the latter moves to its operative position. Alternatively, the commodities can have profiled portions which are adjacent to the path. The blocking means then comprises at least one portion which is complementary to the profiled portion of the next-to-the-foremost commodity in the row and engages such profiled portion in response to movement of the blocking means to its operative position. In such instances, the blocking means need not lift the commodities above the path. For example, the profiled portion of each commodity can define at least one socket, and the complementary portion of the blocking means can comprise at least one projection which extends into the socket of the next-to-the-foremost commodity in the operative position of the blocking means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly sectional view of a tray filling machine which embodies one form of the improved apparatus;

FIG. 2a is an enlarged side elevational view of the improved apparatus, with the blocking device shown in the inoperative position;

FIG. 2b illustrates the structure of FIG. 2a, but with the blocking device shown in operative position;

FIG. 3a is a fragmentary side elevational view of a second apparatus with several modified trays shown in a partly elevational and partly vertical sectional view, the blocking device of the second apparatus being held in the inoperative position; and FIG. 3b illustrates the structure of FIG. 3a but with the blocking device shown in the operative position.

DESCRIPTION OF THE PREFERRED EMBODIMENTS

FIG. 1 shows a tray filling and removing machine which embodies one form of the improved tray singularizing apparatus. This apparatus is designed to separate successive foremost filled trays 2f from the next-following or remaining trays 2nf, 2 . . . of a row of filled trays. However, the apparatus can be used with equal advantage for separation of foremost empty trays 2a from a row of successive empty trays, e.g., in a machine which evacuates the contents of successive filled trays into the magazine of a packing or other processing machine and is designed to advance successive empty trays into the range of a mechanism which delivers such trays to a tray filling station, such as the station 8 defined by the machine shown in FIG. 1.

The tray filling machine which is shown in FIG. 1 comprises a station 1 for a series of empty trays 2a which are supplied from a tray evacuating machine, such as the aforementioned machine which empties the contents of successive filled trays 2 into the magazine of a packing or other processing machine. The station 1 accommodates a horizontal platform 1a for a series of equidistant empty trays 2a the last of which can be engaged and moved forwardly (in the direction of arrow 1b) by a mechanism 3 adapted to be driven by a motor 4 and designed to perform composite forward and rearward movements. Each forward movement involves lifting the mechanism 3 to the position which is shown in the FIG. 1 so that an entraining portion 3a of such mechanism is located behind the rearmost empty tray 2a of the row of trays on the platform 1a, and thereupon moving the mechanism 3 in the direction of arrow 1b so as to advance the entire series of empty trays by a step sufficing to move the foremost empty tray 2a into the range of a stepwise operated lowering conveyor 7 at the tray filling station 8. The reference character 6 denotes a drive which operates the lowering conveyor 7 in stepwise fashion, namely, it lowers the conveyor 7 by increments corresponding to but being preferably slightly less than the diameter of a cigarette 9.

The mode of operation of instrumentalities at the tray filling station 8 is disclosed in several United States patents which are owned by the assignee of the present application, and the disclosures of such patents are incorporated herein by reference. These prior publications include, among others, U.S. Pat. No. 3,190,459 granted June 22, 1965 to Kochalski et al.; U.S. Pat. No. 3,236,356 granted Feb. 22, 1966 to Kochalski et al.; U.S. Pat. No. 3,245,558 granted Apr. 12, 1966 to Kochalski et al.; U.S. Pat. No. 3,481,447 granted Dec. 2, 1969 to Kochalski et al.; U.S. Pat. No. 3,519,143 granted July 7, 1970 to Kochalski et al.; U.S. Pat. No. 3,662,880 granted May 16, 1972 to Kochalski et al.; and U.S. Pat. No. 3,308,600 granted Mar. 14, 1967 to Erdmann et al.

The structure at the tray filling station 8 further comprises a pair of endless belt conveyors 11 which deliver a layer of plain or filter cigarettes 9 or other rod-shaped articles of the tobacco processing industry in a direction at right angles to the plane of FIG. 1 and to a level below a suction head 13 which is movable up and down by a lifting and lowering mechanism 17. The underside of the suction head 13 is formed with a row of parallel flutes 12 which are connected with a suction chamber 16 of the suction head 13 by sets of channels 14 defining suction ports. The suction head 13 is lowered to a level close to and above the path of the cigarettes 9 on the conveyors 11 so that the cigarettes can be lifted into the flutes 12 thereabove to form a row or layer of closely adjacent parallel cigarettes. The suction head 13 is then lifted, together with the freshly formed row of cigarettes 9, to permit the conveyors 11 to advance a fresh layer of cigarettes 9 into the space below the raised suction head 13. A pusher 19 is then actuated by its drive 18 to perform a leftward stroke, as viewed in FIG. 1, and to transfer the layer of cigarettes 9 from the flutes 12 of the raised suction head 13 into the tray 2a' on the conveyor 7. Such layer of cigarettes 9 passes through a mouthpiece 21 and is deposited on top of the previously transferred layer, preferably with some lateral shifting to ensure that the cigarettes in the tray 2a' on the lowering conveyor 7 are arrayed in the so-called quincunx formations. Each layer of cigarettes 9 in the flutes 12 of the suction head 13 is devoid of gaps, and each such layer contains a predetermined number of cigarettes. As a rule, the number of cigarettes 9 in successively formed layers differs by one. When the pusher 19 is retracted to the illustrated position, the suction head 13 descends again and accumulates a fresh layer of cigarettes 9 by lifting them off the upper reaches of the conveyors 11.

Once the tray 2a' on the lowering conveyor 7 has accumulated a certain number of layers of cigarettes 9, it constitutes a filled tray 2 which is deposited on the upper reaches of two endless belt conveyors 23a forming part of a composite conveyor 23. At the same time, the motor 4 causes the transfer mechanism 3 to deliver the next empty tray 2a from the platform 1a into the range of the lowering conveyor 7, and the filling of such next empty tray then proceeds in the aforedescribed manner.

The conveyor 23 is disposed at a station 22 which accommodates a row of successive filled trays 2 and which also accommodates the improved singularizing apparatus. Such apparatus includes the aforementioned composite conveyor 23 which defines a substantially horizontal path for advancement of successive foremost filled trays 2f toward (see the arrow 24) and onto a receiving device 26 here shown as a lifting device which shifts successive singularized foremost trays from the level of the path defined by the parallel horizontal upper reaches of the belt conveyors 23a to a higher level. The lifted filled trays 2fl can be delivered to a tray evacuating device which admits the contents of the trays into the magazine of a packing machine or another processing machine, not shown.

Referring now to FIGS. 2a and 2b, there are shown other constituents of the improved singularizing apparatus whose purpose is to block the forward movement of all but the foremost filled tray 2f on the conveyor 23 when such conveyor is set in motion to advance the foremost tray 2f into the range of the receiving device 26. The means for temporarily halting the forward movement of filled trays 2 with the foremost tray 2f includes a platform-like blocking device 27 and a mechanism for moving the blocking device 27 between an inoperative position (shown in FIG. 2a) at a level below or not above the path which is defined by the upper reaches of the belt conveyors 23a, and an operative position (FIG. 2b) in which the blocking device 27 extends above such path and lifts at least the next-to-the-foremost filled tray 2nf off the upper reaches of the belt conveyors 23a so that only the foremost filled tray 2f can advance toward the receiving device 26 when the conveyor 23 is set in motion to move the upper reaches of its conveyors 23a in the direction of arrow 24. If the conveyor 23 comprises two discrete endless belt or chain conveyors 23a, the blocking device 27 can comprise three platforms one of which is outwardly adjacent to one of the belt conveyors 23a, another of which is disposed between the two belt conveyors 23a, and the third of which is outwardly adjacent to the other belt conveyor 23a. During shifting between the operative position of FIG. 2b and the inoperative position of FIG. 2a, the blocking device 27 moves substantially transversely of the path which is defined by the upper reaches of the belt conveyors 23a.

The means for moving the blocking device 27 between its operative and inoperative positions comprises a pair of parallel links 28 which are pivotable in the frame of the tray filling machine about parallel horizontal axes defined by shafts 29 and 31 and which are articulately connected to the underside of the blocking device 27 by parallel shafts or pins 28a. The links 28 are pivotable back and forth in directions which are indicated by a double-headed arrow 32. The shaft 31 for the rear link 28 (as viewed in the direction of arrow 24) is rigidly connected with a rocker arm 33 cooperating with an eccentric 36 secured to an intermittently driven shaft 34 forming part of the drive in the moving means which can effect movements of the blocking device 27 between operative and inoperative positions.

The singularizing apparatus further comprises an arresting device 37 in the form of a pawl whose pallet 37a can be moved in front of the foremost tray 2f in order to intercept such foremost tray during joint forward movement of the entire row of filled trays 2 on the upper reaches of the belt conveyors 23a. The pawl 37 derives motion from the means for moving the blocking device 27; to this end, the pawl 27 is rigidly secured to a pivot 38 which is turnable in the machine frame and is further rigidly connected to a motion transmitting link 39. The link 39 can be pivoted by a link 42 which is rigidly attached to the shaft 29 for the front link 28, and the means for transmitting motion from the link 42 to the link 39 includes a connecting rod 41. It will be noted that the connection between the arresting pawl 37 and the means for moving the blocking device 27 is such that the blocking device 27 assumes its inoperative position (FIG. 2a) when the pallet 37a of the pawl 37 is located at a level above the upper reaches of the belt conveyors 23a and adjacent to the front side of the foremost filled tray 2f, and that the pallet 37a is retracted to a level below the upper reaches of the belt conveyors 23a when the blocking device 27 is held in the operative position and maintains all filled trays of the row (with the exception of the foremost tray 2f) at a level above the upper reaches of the belt conveyors 23a. The distance between the pallet 37a of the arresting pawl 37 (in the raised position of the pawl) and the front edge of the blocking device 27 is not less than the width of a tray 2 (as considered in the direction of arrow 24). This ensures that the foremost tray 2f (when such foremost tray is arrested by the pallet 37a of the pawl 37) is not lifted with the remaining filled trays in response to movement of the blocking device 27 to the operative position of FIG. 2b.

The pawl 37 is connected or operatively associated with a detector 43 in the form of one or more mechanical sensors serving to monitor the position of the foremost tray 2f on its way toward the receiving device 26. The sensor or sensors 43 can be biased by a spring upwardly into the path of movement of the foremost tray 2f away from the next-following tray 2nf, and such sensor or sensors then generate a signal which is transmitted to one input of an AND gate 46 via conductor means 44. Another input of the AND gate 46 receives signals from a detector 48 (e.g., an electric limit switch) which is connected with the AND gate 46 by conductor means 47 and is designed to transmit a signal when the receiving device 26 reaches its lower end position (tray-accepting position) in which it is ready to accept the foremost tray 2f. As can be seen in FIG. 2b, the base 26a of the receiving device 26 is located at a level below the upper reaches of the belt conveyors 23a when the receiving device 26 is approached by the oncoming foremost filled tray 2f so that such tray can move beyond the upwardly extending projection 26b of the base 26a before the receiving device 26 is caused to move upwardly (arrow 26c) to entrain the tray 2f to a level above the conveyor 23 (note the tray 2f1 in FIG. 1). The output of the AND gate 46 transmits a signal via conductor means 49 to the drive including the shaft 34 for the eccentric 36 when each input of the AND gate receives a signal from the corresponding detector (43, 48).

A further detector in the form of a limit switch or a mechanical sensor 51 is adjacent to the rocker arm 33 and serves as a means for monitoring the position of the blocking device 27. A conductor 52 connects this detector with a drive for the conveyor 23; such drive includes the shaft 53 for the rear pulleys 23b of the conveyor belts 23a.

Still another detector 54 (e.g., a mechanical sensor or a set of mechanical sensors) is installed adjacent to the path of oncoming filled trays 2 which descend from the lowering conveyor 7 toward and thereupon advance with the upper reaches of the belt conveyors 23a. The detector 54 regulates the operation of the lowering conveyor 7 in a manner which is known and not specifically shown in the drawing. Thus, the detector 54 will time the intervals of delivery of freshly filled trays 2ff from the conveyor 7 onto the conveyor 23 in such a way that the space below the conveyor 7 is empty at the time this conveyor permits or causes a freshly filled tray 2ff to descend onto the upper reaches of the belt conveyors 23a preparatory to advancement toward the rearmost filled tray 2 of the row of filled trays on the composite conveyor 23.

The operation of the improved singularizing apparatus is as follows:

The starting positions of moving parts of the singularizing apparatus are shown in FIG. 2a. Thus, the pallet 37a of the arresting pawl 37 is held in front of the foremost filled tray 2f, the blocking device 27 is held in the inoperative position, and the conveyor 23 is in motion so that it causes all trays 2 behind the foremost tray 2f to advance forwardly so as to form a row of equally spaced, closely adjacent and normally abutting filled trays. A freshly filled tray 2ff is in the process of descending from the lowering conveyor 7 onto the upper reaches of the belt conveyors 23a. Such downward movement of the tray 2ff is possible because the detector 54 has transmitted a signal denoting that the previously lowered filled tray 2 has moved out of the space wherein a freshly filled tray is to descend from the conveyor 7 onto the conveyor 23.

The pallet 37a of the arresting pawl 37 ensures that the filled trays of the row of trays on the conveyor 23 assume predetermined positions with reference to the blocking device 27, namely, that the foremost tray 2f is located downstream of such blocking device because the distance between the pallet 37a and the front edge portion of the blocking device 27 exceeds the width of a tray 2, and that the next-to-the-foremost tray 2nf is invariably located at a level above the blocking device 27 as soon as such next-to-the-foremost tray is arrested by the foremost tray 2f. Thus, the blocking device 27 cannot engage and lift the foremost tray 2f as soon as such foremost tray is advanced into contact with the pallet 37a of the arresting pawl 37. The detector 43 ascertains the presence of the foremost tray 2f in the desired position (of abutment with the pallet 37a of the arresting pawl 37) and transmits a corresponding signal to the right-hand input of the AND gate 46 via conductor means 44. The removing device 26 is assumed to be in the process of descending toward the tray-accepting position of FIG. 2b and, when the device 26 reaches such position, its base 26a actuates the limit switch 48 which transmits a signal via conductor means 47 so that the AND gate 46 transmits a signal via activating conductor means 49 and causes the shaft 34 to turn the eccentric 36 so that the rocker arm 33 rotates the corresponding shaft 31 and the associated link 28 in a clockwise direction, as viewed in FIG. 2a, i.e., the blocking device 27 is caused to move counter to the direction which is indicated by the arrow 24 and simultaneously raises its upper side to a level above the upper reaches of the belt conveyors 23a so that the trays 2 behind the foremost filled tray 2f are lifted above and away from the conveyor 23. At the same time, the links 39, 42 and connecting rod 41 cooperate to retract the pallet 37a of the arresting pawl 37 to a level below the upper reaches of the belt conveyors 23a so that the conveyor 23 is free to advance the foremost tray 2f toward the receiving device 26. In FIG. 2b, the links 28 are substantially vertical, whereas the inclination of these links in FIG. 2a is such that the blocking device 27 necessarily moves upwardly when the links 28 are pivoted clockwise to move from the positions of FIG. 2a to the positions of FIG. 2b. The feature that the blocking device 27 has a component of movement counter to the direction indicated by the arrow 24 during clockwise pivoting of the links 28 from the positions shown in FIG. 2a ensures that the blocking device moves the remaining trays 2 of the row of trays on the conveyor 23 rearwardly and away from the foremost tray 2f while the latter is being held by the pallet 37a of the arresting pawl 37.

If the drive for the conveyor 23 is idle while the pawl 37 is held in the position of FIG. 2b, such drive is started automatically in response to a signal from the detector 51 which is actuated by the rocker arm 33 and activates the drive for the conveyor 23 via conductor means 52. The upper reaches of the belt conveyor 23a are then free to move relative to the lifted rear trays 2 but they can only entrain the foremost tray 2f toward and onto the base 26a of the receiving device 26 (which is then held in the accepting position of FIG. 2b).

The detector 43 is free to pivot or otherwise move upwardly as soon as the foremost filled tray 2f is advanced therebeyond. The signal at the corresponding input of the AND gate 46 then disappears so that the shaft 34 returns the eccentric 36 to its initial position in which the blocking device 27 reassumes the inoperative position of FIG. 2a and the pawl 37 reassumes the position (FIG. 2a) in which its pallet 37a is located in the path of movement of the foremost filled tray (2nf) of the remaining row of filled trays on the conveyor 23. The arrangement is preferably such that the shaft 53 continues to drive the belt conveyors 23a for a certain interval of time subsequent to return movement of the blocking device 27 to the inoperative position of FIG. 2a to thus ensure that the remainder of the row of filled trays 2f on the conveyor 23 is advanced in the direction of arrow 24 so that the foremost filled tray reaches and is arrested by the pallet 37a. This can be readily achieved by installing suitable time-delay means in the circuit including the detector 51 and activating conductor means 52. Once the foremost filled tray reaches the pallet 37a, the steps of delivering the foremost filled tray into the range of the receiving device 26 (which, in the meantime, has lifted the filled tray on its base 26a to the next processing station) are repeated in the aforedescribed sequence.

FIGS. 3a and 3b illustrate a portion of a modified apparatus which can singularize trays 102 of the type having profiled bottom portions 102B provided with downwardly extending reinforcing ribs 156 defining compartments or sockets 156a which are accessible from below. In view of such configuration of the bottom portions 102B, it is not necessary to actually lift the trays 102 off the conveyor 123 when the trays following the foremost tray 102 are to be blocked or held against movement toward the receiving device (not shown in FIGS. 3a and 3b). All that is necessary is to provide the blocking device 127 with a complementary profile (note the upwardly extending projections 157) which enters the sockets 156a and thus prevents the engaged trays from moving forwardly (arrow 124). The upper reaches of the belts of the conveyor 123 then merely slide along the undersides of the bottom portions 102B. It suffices to provide a single projection 157, as long as such single projection enters the adjacent socket 156a of the next-to-the-foremost tray 102 of the row of trays on the conveyor 123 when the blocking device 127 is moved to its operative position (FIG. 3b). The extent of pivotal movement of the links 128 and the length of such links must suffice to ensure that, when moved to its inoperative position (FIG. 3a), the blocking device 127 maintains its projections 157 at a level below the bottom portions 102B of the trays 102 thereabove.

An important advantage of the improved singularizing apparatus is that the blocking device 27 or 127 automatically prevents all but the foremost tray of the row of filled trays on the conveyor 23 or 123 from advancing toward the receiving device. Furthermore, and since the blocking device is preferably moved rearwardly (counter to the direction of arrow 24 or 124) during movement to its operative position, it automatically disengages the next-to-the-foremost tray from the foremost tray of the row to thus prevent any changes in orientation of the foremost tray prior to retraction of the arresting device preparatory to actual advancement of the foremost tray toward the receiving device, i.e., away from the remaining trays of the row of trays on the conveyor 23 or 123.

Another important advantage of the improved apparatus is that the illustrated relatively simple detectors in the form of limit switches, mechanical sensors, optical monitoring means or the like ensure proper synchronization of movements of various parts between their operative and inoperative, first and second, raised and lowered, accepting and non-accepting positions so that the apparatus guarantees predictable and highly reproducible manipulation of each tray of a short or long series of successive trays.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for singularizing trays which form a row of trays for stacks of cigarettes or the like, comprising conveyor means arranged to support the row of trays and to advance successive foremost trays of the row along a predetermined path and in a predetermined direction away from the remaining trays of the row; means for blocking the movement of the next-to-the-foremost tray of the row with the foremost tray; means for moving said blocking means substantially transversely of said path between an operative position in which said blocking means prevents advancement of the next-to-the-foremost tray in said direction by lifting the trays thereon to a level above said path and out of contact with said conveyor means and an inoperative position in which said blocking means is disengaged from the trays in said path so that the conveyor means is free to advance the trays of said row in said direction; means for receiving successive trays from said conveyor means, said receiving means being movable to and from a tray-accepting position; means for monitoring said receiving means and for generating first signals in the accepting position of said receiving means; first detector means adjacent to said path ahead of said blocking means, as considered in said direction, and arranged to generate second signals in response to detection of advancement of the foremost tray away from the remainder of the row in said path; means for activating said moving means in response to said first and second signals so as to move said blocking means from the operative to the inoperative position; drive means activatable to set said conveyor means in motion; second detector means for monitoring the position of said blocking means and for generating third signals when said blocking means assumes said operative position; an arresting device movable by said moving means between a first position in which said arresting device extends into said path in front of the foremost tray of the row of trays in said path and said blocking means assumes said inoperative position and a second position in which said arresting device is outside of said path and permits the foremost tray to advance along said path under the action of said conveyor means while said blocking means assumes said operative position; and means for activating said drive means in response to said third signals for intervals of time which are required to advance the foremost tray of the row into engagement with said receiving device, and when the foremost article is conveyed past said arresting device said first detector means causes said moving means to move said arresting device to the first position and said blocking means to the inoperative position so that the row of articles is advanced by said conveyor means into engagement with said arresting device before said drive means for said conveyor is stopped.

2. The apparatus of claim 1, wherein said receiving means comprises a device for lifting successive foremost trays to a level above said path.

3. The apparatus of claim 1, wherein said conveyor means comprises a plurality of discrete endless conveyors having spaced parallel reaches defining said path.

4. The apparatus of claim 1, wherein said path is at least substantially horizontal.

5. The apparatus of claim 1, wherein said moving means includes links pivotable about substantially horizontal axes to move said blocking means substantially counter to said direction during movement from said inoperative to said operative position.

6. The apparatus of claim 5, wherein said links are arranged to raise at least a portion of said blocking means into engagement with the next-to-the-foremost tray in said path, at least during the last stage of movement of said blocking means to said operative position.

7. The apparatus of claim 5, wherein said links are parallel to one another.

8. The apparatus of claim 1, wherein said receiving means includes a device for shifting successive foremost trays from the level of said path to a different level and said shifting device assumes said accepting position when it is ready to receive the foremost tray from said conveyor means while such tray advances along said path.

9. The apparatus of claim 8, wherein said shifting device is a lifting device.

10. The apparatus of claim 1, wherein said first detector means comprises a mechanical sensor.

11. The apparatus of claim 1, wherein said conveyor means comprises at least one endless belt or chain conveyor having an elongated reach defining said path.

12. The apparatus of claim 1, wherein said arresting device is located downstream of said blocking means, as considered in said direction.

13. The apparatus of claim 12 for singularizing trays having a predetermined width, as considered in said direction, wherein said arresting device is spaced apart from said blocking means by a distance which at least equals said predetermined width.

14. The apparatus of claim 13, wherein said arresting device comprises a pawl which is pivotable to and from said first position thereof and includes a pallet extending into said path in front of the foremost tray in the first position of said pawl.

15. The apparatus of claim 1 for singularizing trays having profiled portions adjacent to said path, wherein said blocking means comprises at least one portion complementary to and engaging the profiled portion of the next-to-the-foremost tray of the row in said path in response to movement of said blocking device to said operative position.

16. The apparatus of claim 15, wherein each of the profiled portions defines at least one socket and said complementary portion includes a projection extending into the socket of the next-to-the-foremost tray in the operative position of said blocking means.

* * * * *